Feb. 28, 1956 A. W. LIPPMANN 2,736,617
ROLLER BEARING

Filed Nov. 23, 1953 2 Sheets-Sheet 1

INVENTOR
ARTHUR W. LIPPMANN

BY

ATTORNEYS

Feb. 28, 1956  A. W. LIPPMANN  2,736,617
ROLLER BEARING
Filed Nov. 23, 1953  2 Sheets-Sheet 2
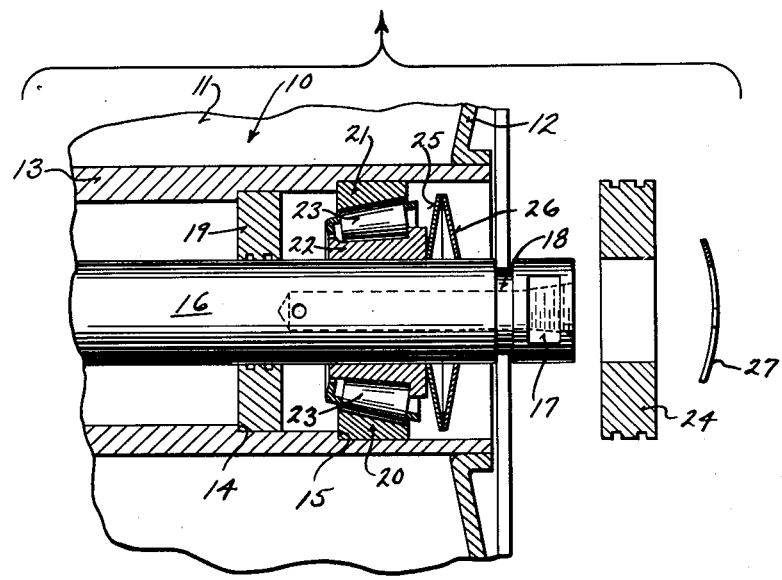
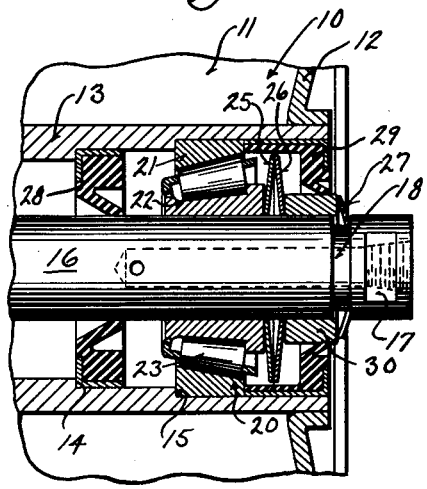
INVENTOR
ARTHUR W. LIPPMANN
BY
*Young Wright*
ATTORNEYS United States Patent Office 2,736,617
Patented Feb. 28, 1956

2,736,617

ROLLER BEARING

Arthur W. Lippmann, Milwaukee, Wis., assignor to Lippmann Engineering Works, Milwaukee, Wis., a partnership Application November 23, 1953, Serial No. 393,660

1 Claim. (Cl. 308—20)

This invention appertains broadly to idler rolls for supporting belt conveyors, and more particularly to a novel bearing assembly for the ends of the rolls.

In conveyor belts, the idler rolls rotate freely on stationary shafts carried by a suitable frame. Interposed between the rolls and shafts are anti-friction bearings, usually (but not necessarily), of the roller type. The outer race of the bearing fits against an internal shoulder in the idler roll and means is provided for engaging the inner race to detachably hold the bearing in place. This holding means sometimes consists of nuts threaded on the shaft ends and difficulty is encountered (in confined places) in placing the nuts in position and the nuts have to be adjusted from time to time, as wear occurs. The distance between the stop shoulder in the roll for the outer race and the shaft end often varies during manufacture, which makes it impractical to use any type of quick fastening device other than nuts.

One of the primary objects of my invention is the provision of novel means incorporated directly in the bearing assembly and forming a part thereof, which will permit the effective use of locking rings for holding the bearing assembly in place, the said means taking up any variation in distance between the internal shoulder of the roll and the groove in the shaft for the locking ring and said means also functioning for effectively taking up wear as the same occurs, automatically, and without the necessity of adjusting any parts.

Another salient object of the invention is the provision of the use of a pair of facing spring washers of the dished or concavo-convex type, disposed on the shaft between the inner race and the holding means, the facing spring washers tending at all times to spread and effectively hold the bearing in proper position.

A further important object of my invention is the provision of a spring take-up in a bearing assembly of the above character, which can be used with any type of commercial oil seals now commonly used in bearing assemblies.

With these and other objects in view the invention consists in the novel construction, arrangement and formation of parts, as will be hereinafter more specifically described and claimed, and illustrated in the accompanying drawings, in which drawings, Figure 1 is a fragmentary longitudinal sectional view through an idler roll illustrating my novel bearing assembly and showing the use of one particular type of oil or grease seal.

Figure 3 is a view similar to Figure 1, but showing the various parts of the bearing assembly separated and being assembled on the shaft and roll.

Figure 4 is a view similar to Figure 1, but showing my assembly in use with a different type of oil or grease seal.

Figure 1:
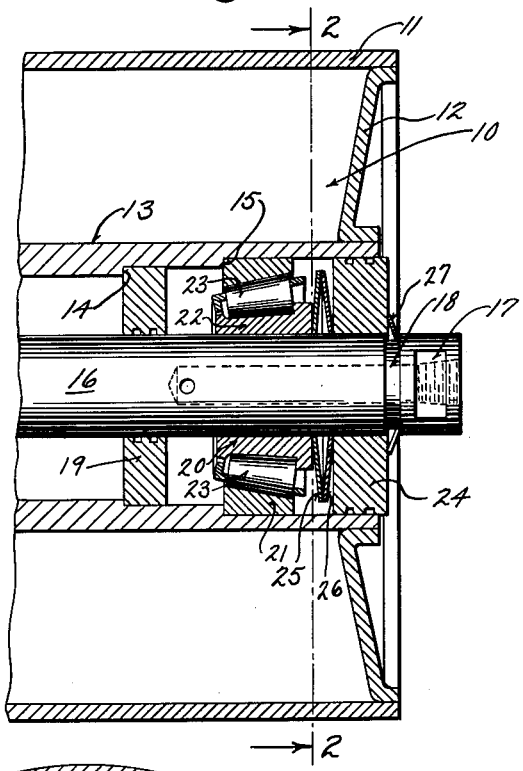

Referring to the drawings in detail, wherein similar reference characters designate corresponding parts throughout the several views, the numeral 10 generally indicates an idler roll of the type commonly used for supporting conveyor belts and this roll includes a cylindrical shell 11 having a dished head 12 which supports the spacer and grease tube 13. The inner surface of the tube adjacent to its end is provided with stop shoulders 14 and 15. Extending through the tube 13 is a shaft 16. The shaft at its end is provided with flattened surfaces 17 for engaging in the frame (not shown) of the conveyor and the outer end of the shaft is also provided with means for receiving a grease fitting. The shaft directly inward of the flattened surfaces 17 is provided with an annular lock groove 18, for a purpose, which will later appear.

Figure 2:
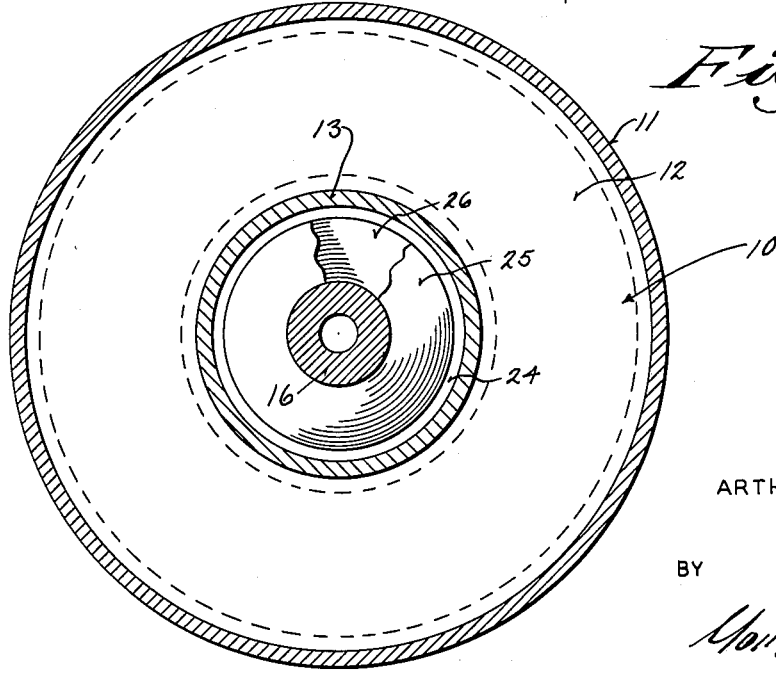
Figure 2 is a transverse sectional view taken on the line 2—2 of Figure 1, looking in the direction of the arrows, and showing more particularly the facing spring washers.

In the form shown, in Figures 1 to 3, inclusive, I have shown oil or grease seals of the disc type provided with oil grooves and this seal includes an inner disc 19 fitted against the shoulder 14. Arranged within the tube 13 is the bearing 20 which has been shown of the roller type. The bearing includes the usual outer race 21 and the inner race 22. Interposed between the races are the rollers 23. The outer race 21 is fitted in intimate contact with the shoulder 15. In usual practice, the outer sealing disc 24 is placed on the shaft against, or in close proximity to the inner race 22, but in accordance with my invention, I interpose between the disc 24 and the inner race 22 resilient or spring washers 25 and 26. These resilient washers are formed from a desired character of spring metal. The washers are of the dished or concavo-convex type and the washers are assembled together in a novel fashion (see Figures 1 and 3). The washers 25 and 26 are placed in facing relation with their peripheral edges in intimate contact. As is clearly shown in Figures 1 and 3, the washers 25 and 26 are slipped on the shaft 16 against the outer face of the inner race 22 after which the disc 24 is placed on the shaft and is urged against the washers so as to normally place the washers under tension, as shown in Figure 1, and until the disc 24 is inward of the locking groove 18. At this time, the locking ring 27 is slipped into the groove 18 and against the sealing disc 24 and this effectively holds the entire bearing assembly in place.

Obviously, the facing spring washers 25 and 26 placed under tension will effectively held the outer race 21 against the shoulder 15 and these washers will effectively take up any variation in distance between the shoulder 15 and the groove 18. Likewise these washers 25 and 26 will automatically take up any wear in the bearing should the same occur.

In Figure 4 of the drawings, I have shown my improved bearing assembly used in connection with oil and grease seals, of a different type, than I have shown in Figures 1, 2 and 3. In Figure 4, the assembly employs flexible inner and outer seals 28 and 29 of a well-known type formed from rubber, neoprene or like material encased within a hollow metallic shell. The inner seal 28 bears against the shoulder 14 and the flexible portion of this inner seal engages the shaft. The outer seal 29 bears against a spacing sleeve 30, which is placed on the shaft between the spring washers 25 and 26 and the lock washer 27. In this type of assembly, the spacer sleeve 30 is slid on the shaft to compress the washers 25 and 26 after which the spring washer 27 is slipped in the groove.

While I have shown a specific type of resilient or spring take up means, it is to be understood that I can employ rubber or other similar resilient compressible members between the inner race of the bearing and the locking or holding means on the shaft. It is to be also understood that any desired type of locking or holding means can be used in connection with the shaft for holding the assembly in place.

It is again brought out that any desired type of oil and grease seal can be used with my assembly.

Changes in details may be made without departing from the spirit or the scope of this invention, but what I claim as new is:

In a bearing assembly a stationary shaft having a groove, an idler roll mounted on the shaft including an axially disposed tube having an inner shoulder, an inner seal fitted around the shaft and carried by the tube, an anti-friction bearing adapted to be slidably mounted in said tube and including an outer race fitted against the shoulder and an inner race receiving the shaft, a spacer sleeve on the shaft, an outer seal engaging the tube and the spacer sleeve, a pair of facing resilient washers of a dished shape disposed between the inner race and the spacer sleeve with their peripheries in engagement and held under tension by the sleeve, and a lock washer engaging the spacer sleeve and fitting in the groove.

References Cited in the file of this patent
UNITED STATES PATENTS

| | | |
|---|---|---|
| 2,136,155 | Spicacci | Nov. 8, 1938 |
| 2,389,446 | McCormack | Nov. 20, 1945 |
| 2,641,515 | Bankauf et al. | June 9, 1953 |
| 2,647,025 | Deffenbaugh | July 28, 1953 |